(12) United States Patent
Ehlert et al.

(10) Patent No.: US 11,536,949 B2
(45) Date of Patent: Dec. 27, 2022

(54) LASER PROJECTION DEVICE

(71) Applicant: Robert Bosch GmbH, Stuttgart (DE)

(72) Inventors: Alexander Ehlert, Reutlingen (DE);
Daniel Kreye, Langebrueck (DE);
Hendrik Specht, Pliezhausen (DE)

(73) Assignee: Robert Bosch GmbH, Stuttgart (DE)

( * ) Notice: Subject to any disclaimer, the term of this patent is extended or adjusted under 35 U.S.C. 154(b) by 312 days.

(21) Appl. No.: 16/761,126

(22) PCT Filed: Sep. 27, 2018

(86) PCT No.: PCT/EP2018/076371
§ 371 (c)(1),
(2) Date: May 1, 2020

(87) PCT Pub. No.: WO2019/101402
PCT Pub. Date: May 31, 2019

(65) Prior Publication Data
US 2020/0285046 A1 Sep. 10, 2020

(30) Foreign Application Priority Data
Nov. 22, 2017 (DE) .......................... 102017220813.9

(51) Int. Cl.
*G02B 26/08* (2006.01)
*G02B 26/10* (2006.01)
(52) U.S. Cl.
CPC ....... *G02B 26/0833* (2013.01); *G02B 26/101* (2013.01)

(58) Field of Classification Search
CPC . G02B 26/0833; G02B 26/101; G02B 26/105
USPC ....................................... 359/223.1
See application file for complete search history.

(56) References Cited

U.S. PATENT DOCUMENTS

2006/0117854 A1* 6/2006 Turner ............... G02B 26/0833
73/579

FOREIGN PATENT DOCUMENTS

| DE | 102009058762 A1 | 6/2011 |
| EP | 2902836 A1 | 8/2015 |
| EP | 2977811 A1 | 1/2016 |

OTHER PUBLICATIONS

International Search Report for PCT/EP2018/076371 dated Dec. 17, 2018.

* cited by examiner

*Primary Examiner* — Euncha P Cherry
(74) *Attorney, Agent, or Firm* — Norton Rose Fulbright US LLP; Gerard Messina

(57) ABSTRACT

A laser projection device, including at least one reflector unit having at least one reflector element that is configured to deflect at least one laser beam to be projected, and having at least one drive unit that is configured to excite at least the reflector element into resonant vibration. The laser projection device includes at least one temperature compensation unit, which is configured to acquire a vibrational frequency of at least the reflector element and to ascertain the temperature of the reflector unit from it.

11 Claims, 3 Drawing Sheets

LASER PROJECTION DEVICE

BACKGROUND INFORMATION

A laser projection device is already available, which includes at least one reflector unit having at least one reflector element configured to deflect at least one laser beam to be projected, and having at least one drive unit configured to excite at least the reflector element into resonant vibration.

SUMMARY

The present invention includes a laser projection device, which includes at least one reflector unit having at least one reflector element configured to deflect at least one laser beam to be projected, and having at least one drive unit configured to excite at least the reflector element into resonant vibration.

In accordance with an example embodiment of the present invention, it is provided that the laser projection device includes at least one temperature compensation unit, which is configured to acquire a vibrational frequency of at least the reflector element and to ascertain the temperature of the reflector unit from it.

A "reflector element" is to be understood as, in particular, a reflective element for electromagnetic radiation, in particular, electromagnetic radiation visible to a human eye. In particular, the reflector element is reflective in a range of an electromagnetic spectrum, in which the laser projection device emits electromagnetic radiation. The reflector element is preferably made at least partially of a material that reflects electromagnetic radiation. In particular, the reflector element may be made at least partially of gold, silver, silicon or another material that reflects electromagnetic radiation and appears suitable to one skilled in the art. Alternatively, or in addition, it is possible for the reflector element to have a coating on an upper surface of the reflector element; the coating reflecting electromagnetic radiation. In particular, it may be preferable for the coating to be made at least partially of gold, silver, silicon or another material, which reflects electromagnetic radiation and appears suitable to one skilled in the art. For a particularly high reflectance, the reflector element may preferably have, in addition, a polished, particularly preferably, a mirror-finished, upper surface.

The reflector element preferably takes the form of a horizontal mirror, which is set up in the laser projection device to project horizontal lines of an image. To project horizontal lines of an image, the reflector element is preferably supported movably, in particular, rotatably. The reflector element is preferably movably supported, in particular, rotationally mounted, with the aid of a mechanism. It is preferable for the mechanism to take the form of a, in particular, mechanical, spring system.

The reflector element is preferably configured to deflect at least one laser beam. In particular, "configured" is to be understood as, in particular, specially programmed, designed and/or equipped. That an object is configured for a particular function, is to be understood to mean, in particular, that the object fulfills and/or executes this particular function in at least one application state and/or operating state. Through deflection of the laser beam, at least one image may preferably be projected onto a projection surface. The laser beam is preferably generated by a radiation source of the laser projection device. The radiation source may take the form of, in particular, a solid-state laser, a gas laser, a molecular laser or another source of laser radiation appearing suitable to one skilled in the art. It is particularly preferable for the radiation source to take the form of a laser diode. In particular, the laser projection device may include a plurality of laser diodes. The laser projection device preferably includes, in particular, a laser diode emitting in a red spectral range, a laser diode emitting in a green spectral range, and a laser diode emitting in a blue spectral range.

The drive unit preferably takes the form of an electromagnetic, an electrostatic, a thermoelectric, a piezoelectric or another drive unit appearing suitable to one skilled in the art. In particular, the drive unit may be driven by electrical energy. Preferably, the drive unit may be controlled with the aid of an electrical driving signal. The drive unit is preferably coupled mechanically to the reflector element for exciting a resonant vibration of the reflector element. It is particularly preferable for the reflector element and the drive unit to be formed in one piece. The reflector element, the drive unit and the mechanism for rotatably supporting the reflector element are preferably situated on a single chip in the form of a microelectromechanical systems (MEMS). In particular, the reflector element, the drive unit and the mechanism for rotatably supporting the reflector element may form a MEMS micromirror. Preferably, the MEMS micromirror may correspond to the reflector unit.

In particular, the drive unit preferably vibrates at least substantially at the resonant frequency of the reflector element. In this case, that "the drive unit vibrates at least substantially at a resonant frequency of the reflector element," is to be understood to mean, in particular, that the drive unit vibrates at such a frequency, that the reflector element is driven resonantly; possible frictional losses from a mechanical coupling of the drive unit to the reflector element being compensated for. That "the drive unit is configured to excite at least the reflector element into resonant vibration," is to be understood to mean, in particular, that the drive unit may excite only the reflector element into a resonant vibration or may excite the reflector element and further components connected, in particular, to the reflector element, into a resonant vibration. A resonant frequency of the individual reflector element is preferably different from a resonant frequency of the reflector element with further components connected to the reflector element. In one form of the reflector unit as a MEMS micromirror, the drive unit excites, in particular, the complete reflector unit into a resonant vibration. A vibrational frequency of the complete reflector unit, in particular, the resonant frequency of the complete reflector unit, is preferably determined, and the temperature of the reflector unit is ascertained from it.

The temperature compensation unit is preferably connected to the drive unit. In particular, the temperature compensation unit is preferably connected electroconductively to the drive unit. By acquiring a, in particular, electrical, signal of the drive unit, the temperature compensation unit may determine the vibrational frequency of at least the reflector element. The vibrational frequency of at least the reflector element preferably corresponds to the resonant frequency of at least the reflector element. The vibrational frequency of at least the reflector element is proportional to the temperature of the reflector unit. Thus, with the aid of the vibrational frequency of at least the reflector element, the temperature compensation unit may ascertain the temperature of the reflector unit. In one development of the reflector unit as a MEMS micromirror, the vibrational frequency of the complete reflector unit may preferably be acquired via the signal of the drive unit. In particular, the temperature compensation unit may ascertain the temperature of the reflector unit in light of the vibrational frequency of the complete reflector unit.

The temperature of the reflector unit may advantageously be ascertained by the example embodiment of the laser projection device according to the present invention. In particular, the temperature may be ascertained with the aid of components of the laser projection device already present, which are configured to perform other functions. This may advantageously eliminate the need for additional components, such as a temperature sensor, to determine the temperature of the reflector unit. The laser projection device may be designed advantageously to be compact and low-maintenance, and may be manufactured inexpensively in an advantageous manner.

In addition, it is provided that the temperature compensation unit include at least one processing unit, which is configured to compute the temperature of the reflector unit from the vibrational frequency of at least the reflector element, and/or to compute a change in the temperature of the reflector unit from a change in the vibrational frequency of at least the reflector element. In one form of the reflector unit as a MEMS micromirror, the processing unit is configured, in particular, to calculate the temperature of the reflector unit from the vibrational frequency of the complete reflector unit, and/or to calculate a change in temperature of the reflector unit from a change in the vibrational frequency of the reflector unit. A "processing unit" is to be understood as, in particular, a controller having a processor, a storage unit, and/or an operating, control and/or computational program stored in the storage unit. The processor may take the form of, in particular, a microprocessor. Preferably, the processor may take the form of a digital signal processor (DSP). In particular, it is preferable for the processing unit to be able to take the form of an application-specific integrated circuit or a part of an application-specific integrated circuit. A characteristic curve of a dependence of the vibrational frequency of at least the reflector element on the temperature of the reflector unit is advantageously stored in the storage unit of the processing unit. With the aid of the computational program stored in the storage unit, the processing unit, in particular, the processor of the processing unit, may calculate the temperature of the reflector unit in light of a comparison of the acquired vibrational frequency of at least the reflector element with the characteristic curve.

Preferably, the processing unit is also configured to compare vibrational frequencies of at least the reflector element determined at different times, to the characteristic curve, and to calculate the temperature of the reflector unit at different times. If the vibrational frequency of at least the reflector element changes between the different times, the processing unit may calculate the change in the temperature of the reflector unit from the change in the vibrational frequency of the reflector element. The temperature and/or the change in the temperature of the reflector unit may be determined in an advantageous manner.

In addition, it is provided that the example laser projection device include at least one frequency reference element, which is configured to provide at least one reference frequency for the temperature compensation unit, which is configured to ascertain the vibrational frequency of at least the reflector element in light of a correlation with the reference frequency. The frequency reference element preferably takes the form of a quartz oscillator. In particular, it is preferable for the frequency reference element to be able to vibrate over a long period of time at the reference frequency and to deviate from the reference frequency very little. A "long period of time" is to be understood as, in particular, a period of time, which corresponds to at least one year, preferably, at least two years, and particularly preferably, a complete service life of the laser projection device without the frequency reference element. To "deviate very little" is to be understood as, in particular, deviations of less than one one hundred millionth of the reference frequency.

The reference frequency preferably corresponds to a multiple of the resonant frequency of the reflector element. In one development of the reflector unit as a MEMS micromirror, the reference frequency preferably corresponds to a multiple of the resonant frequency of the complete reflector unit. In particular, a driving frequency of at least the reflector element may be derived from the reference frequency of the frequency reference element, using at least one adjustable, non-integral divider. A non-integral divider preferably constitutes a physical unit, which is intended for deriving a driving signal having a driving frequency, from a reference signal having a reference frequency. Preferably, the driving frequency of at least the reflector element may be derived from the reference frequency of the frequency reference element, using a plurality of adjustable, non-integral dividers. Preferably, the adjustable, non-integral dividers may be set in such a manner, that the driving frequency derived from the reference frequency corresponds at least substantially to the resonant frequency of at least the reflector element. In the case of a change in the resonant frequency of at least the reflector element to a new resonant frequency, in particular, the adjustable, non-integral dividers may be readjusted, so that the driving frequency derived from the reference frequency corresponds at least substantially to the new resonant frequency. A setting value of an adjustable, non-integral divider preferably establishes a relation between the reference frequency of the frequency reference element and the vibrational frequency of at least the reflector element.

To provide the reference frequency, the frequency reference element is preferably connected to the temperature compensation unit. It is particularly preferable for the frequency reference element to be able to be connected, in particular, electroconductively, to the temperature compensation unit. The reference frequency is preferably provided to the temperature compensation unit, in particular, in the form of an electrical signal. The temperature compensation unit is preferably configured to correlate the signal of the vibrational frequency of at least the reflector element from the drive unit with the signal of the reference frequency from the frequency reference element. The temperature compensation unit, in particular, the processing unit of the temperature compensation unit, may ascertain the vibrational frequency of at least the reflector element in light of the correlation of the two signals. Preferably, the temperature compensation unit, in particular, the processing unit of the temperature compensation unit, may calculate the vibrational frequency of at least the reflector element in light of the reference frequency and the setting values of the adjustable, non-integral dividers. The vibrational frequency of at least the reflector element may be determined in an advantageous manner.

In addition, it is provided that the temperature compensation unit be configured to compensate for a temperature-dependent deviation of a detected position of at least the reflector element, in light of the ascertained temperature. In particular, the detected position of at least the reflector element may show a different sensitivity at different temperatures. In particular, different positions of at least the reflector element may be detected at different temperatures, in spite of the same position of at least the reflector element.

In particular, a phase lag of the detection of the position of at least the reflector element may change at different temperatures. In particular, errors in the detected position of at least the reflector element may occur due to changes in the temperature. The temperature compensation unit, in particular, the processing unit of the temperature compensation unit, is configured to calculate a correction coefficient for the detected position of at least the reflector element in light of the ascertained temperature of the reflector unit. In particular, the temperature compensation unit, in particular, the processing unit of the temperature compensation unit, is configured to calculate different correction coefficients for the detected position of at least the reflector element at different temperatures of the reflector unit. With the aid of the correction coefficient, the temperature compensation unit may compensate for the temperature-dependent deviation of the detected position of at least the reflector element. Correct detection of a position of at least the reflector element at different temperatures may be ensured in an advantageous manner.

In addition, it is provided that the laser projection device include at least one piezoelectric measuring bridge for detecting a position of at least the reflector element; the temperature compensation unit being configured to compensate for a temperature drift of the piezoelectric measuring bridge with the aid of the ascertained temperature. Preferably, the piezoelectric measuring bridge is made at least partially of a piezoresistive material. In particular, the piezoelectric measuring bridge is made at least partially of silicon, germanium or another piezoresistive material appearing suitable to one skilled in the art. That a material is piezoresistive, is to be understood to mean that, in particular, deformation of the material as a result of the action of a force on the material causes a change in an electrical resistance of the material. The change in the electrical resistance of the material is preferably detected, in particular, with the aid of an electrical bridge circuit of the piezoelectric measuring bridge, in particular, particularly preferably with the aid of a Wheatstone bridge of the piezoelectric measuring bridge. The electrical bridge circuit of the piezoelectric measuring bridge preferably supplies an electrical voltage signal as a result of the change in the electrical resistance of the piezoresistive material.

For detecting a position of at least the reflector element, the piezoelectric measuring bridge is preferably connected, in particular, mechanically connected, to at least the reflector element. In response to the action of a force on the piezoelectric measuring bridge, the piezoelectric measuring bridge generates an electrical voltage signal proportional to the acting force. In different positions of at least the reflector element, different forces are applied to the piezoelectric measuring bridge via the coupling of at least the reflector element with the piezoelectric measuring bridge. In proportion to the different forces, the piezoelectric measuring bridge generates different electrical voltage signals, which correspond to different positions of at least the reflector element. Detection of the position of at least the reflector element is possible, using the electrical voltage signals of the piezoelectric measuring bridge.

The electrical voltage signals are a function of both the acting force and the temperature. If the temperature of the reflector unit changes, then a temperature drift of the piezoelectric measuring bridge occurs. That is, due to the change in temperature, the electrical voltage signal of the piezoelectric measuring bridge changes in spite of the action of an unchanged force on the piezoelectric measuring bridge. The temperature compensation unit, in particular, the processing unit of the temperature compensation unit, is preferably configured to calculate a correction coefficient for the electrical voltage signal of the piezoelectric measuring bridge in light of the ascertained temperature of the reflector unit. In particular, the temperature compensation unit, in particular, the processing unit of the temperature compensation unit, is preferably configured to calculate different correction coefficients for the electrical voltage signal of the piezoelectric measuring bridge at different temperatures of the reflector unit. With the aid of the correction coefficient, the temperature compensation unit may compensate for the temperature drift of the piezoelectric measuring bridge. Detection of a position of at least the reflector element at different temperatures with the aid of the piezoelectric measuring bridge may be ensured in an advantageous manner.

In addition, the present invention includes a method for operating a laser projection device of the present invention, which includes at least one reflector unit that has at least one reflector element configured to deflect at least one laser beam to be deflected, and at least one drive unit that is configured to excite at least the reflector element into resonant vibration.

In accordance with the present invention, it is provided that a temperature of the reflector unit be ascertained with the aid of a vibrational frequency of at least the reflector element. This may advantageously eliminate the need for additional components, such as a temperature sensor, to determine the temperature of the reflector unit.

In addition, it is provided that the temperature of the reflector unit be calculated from the vibrational frequency of at least the reflector element, and/or that a change in the temperature of the reflector unit be calculated from a change in the vibrational frequency of at least the reflector element. The temperature and/or the change in the temperature of the reflector unit may be determined in an advantageous manner.

In addition, in accordance with an example embodiment of the present invention, it is provided that a reference frequency be supplied and the vibrational frequency of at least the reflector element be ascertained with the aid of a correlation with the reference frequency. It is advantageous that the vibrational frequency of at least the reflector element may be determined in a more accurate manner than exclusively via a signal of a drive unit.

Furthermore, in accordance with an example embodiment of the present invention, it is provided that a temperature-dependent deviation of a detected position of at least the reflector element be compensated for in light of the ascertained temperature. Detection of a position of at least the reflector element at different temperatures may be ensured in an advantageous manner.

In addition, in accordance with the present invention, it is provided that a position of at least the reflector element be detected with the aid of a piezoelectric measuring bridge, and that a temperature drift of the piezoelectric measuring bridge be compensated for in light of the ascertained temperature. Detection of a position of at least the reflector element at different temperatures with the aid of the piezoelectric measuring bridge may be ensured in an advantageous manner.

In addition, the present invention includes a laser projector having at least one laser projection device of the present invention, which includes at least one reflector unit that has at least one reflector element configured to deflect at least one laser beam to be projected and at least one drive unit that is configured to excite at least the reflector element into resonant vibration. The laser projector preferably includes still other components necessary for operating the laser projector. In particular, the laser projector preferably includes at least one power supply, at least one data input, at least one image processor, at least a housing, as well as further components appearing suitable to one skilled in the art. A laser projector usable in a broad temperature range may be advantageously provided.

In this connection, the example laser projection device of the present invention and/or the example method of the present invention and/or the example laser projector of the present invention shall not be limited to the use and specific embodiment described above. In particular, in order to achieve a functionality described here, the laser projection device of the present invention and/or the method of the present invention and/or the laser projector of the present invention may have a number of individual elements, component parts and units, as well as method steps, different from a number mentioned here. In addition, in the ranges of values indicated in this description, values lying within the above-mentioned limits are also to be acknowledged as described and as applicable as desired.

BRIEF DESCRIPTION OF THE DRAWINGS

Further advantages are derived from the description of the figures below. An exemplary embodiment of the present invention is depicted in the figures. The figures and the description include numerous features in combination. One skilled in the art will necessarily consider the features individually, as well, and unite them to form useful, further combinations.

DETAILED DESCRIPTION OF EXAMPLE EMBODIMENTS

Figure 1:
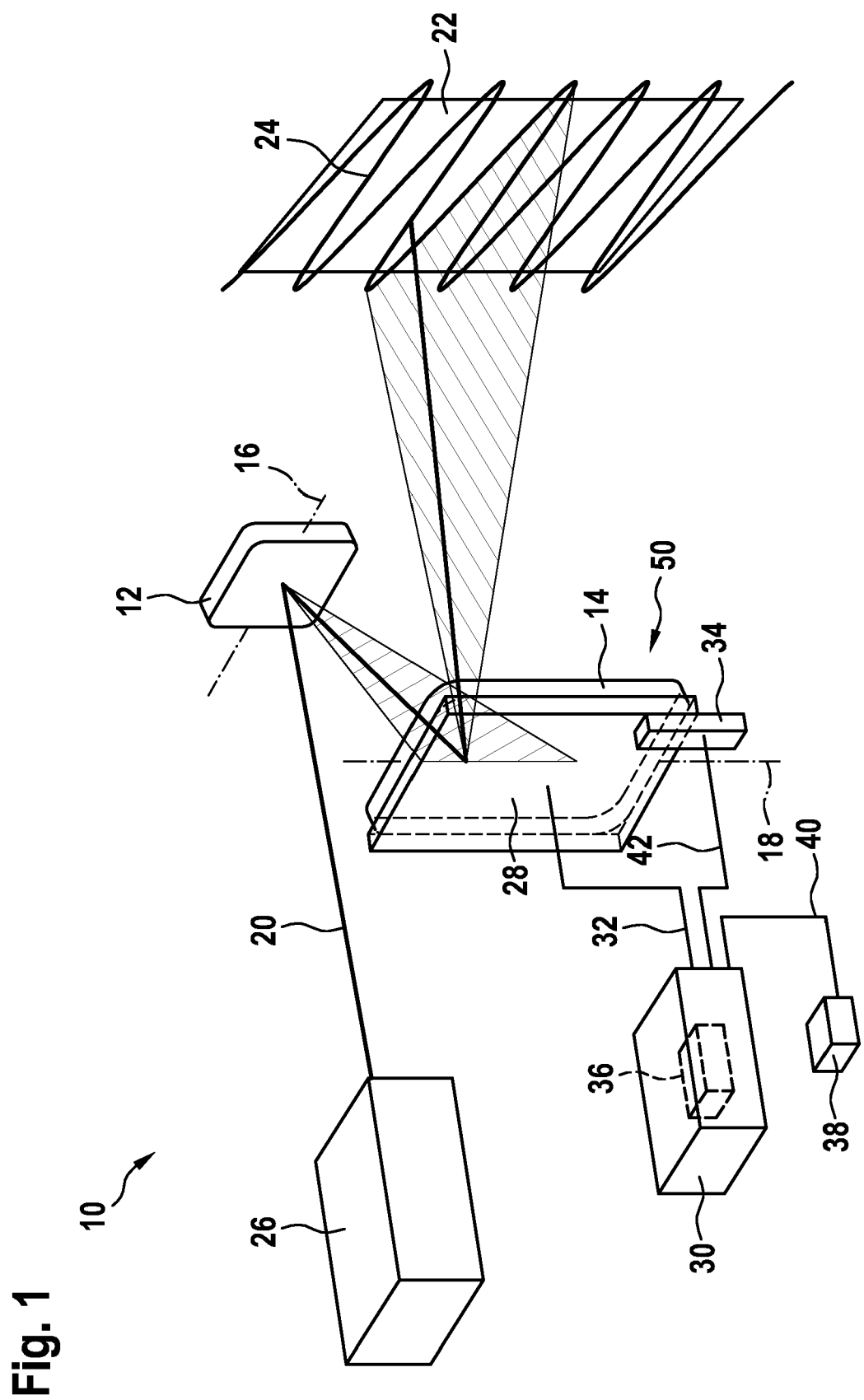
FIG. 1 shows a schematic representation of an example laser projection device according to the present invention.

FIG. 1 shows a schematic representation of an example laser projection device 10 according to the present invention. Laser projection device 10 includes a first reflector element 12 and a second reflector element 14. First reflector element 12 takes the form of a vertical mirror and is supported so as to be movable about a first axis of rotation 16. Second reflector element 14 takes the form of a horizontal mirror and is supported so as to be movable about a second axis of rotation 18. Reflector elements 12, 14 are supported by mechanical spring systems not shown in further detail, so as to be rotatable about axes of rotation 16, 18. First axis of rotation 16 and second axis of rotation 18 are oriented substantially perpendicularly to each other. In this case, the expression "substantially perpendicularly" shall define, in particular, an orientation of first axis of rotation 16 relative to second axis of rotation 18; in particular, viewed in a plane, first axis of rotation 16 and second axis of rotation 18 forming an angle of 90°, and the angle having a maximum deviation of, in particular, less than 8°, advantageously, less than 5°, and particularly advantageously, less than 2°.

First reflector element 12 is configured to deflect a laser beam 20 in a vertical direction. In this case, a vertical direction is to be understood as, in particular, a direction at least substantially perpendicular to first axis of rotation 16.

Second reflector element 14 is configured to deflect the laser beam 20 deflected by first reflector element 12, in a horizontal direction. In order to clearly represent the functionality of second reflector element 14, second reflector element 14 is depicted semitransparently. In this case, a horizontal direction is to be understood as, in particular, a direction at least substantially perpendicular to second axis of rotation 18. Using the laser beam 20 deflected by the two reflector elements 12, 14, laser projection device 10 projects an image 22 onto a projection surface 24. Laser beam 20 is generated by a radiation source 26. Radiation source 26 takes the form of a laser diode.

On their upper surfaces, the two reflector elements 12, 14 each include a coating that reflects electromagnetic radiation. The reflective coating is made of gold. Alternatively, the reflective coating may also be made of silver, silicon, or another material, which reflects electromagnetic radiation and appears suitable to one skilled in the art. The upper surfaces of the two reflector elements 12, 14 are each mirror-finished for a high reflectance. For a high reflectance, the upper surfaces of the two reflector elements 12, 14 each have sufficiently high planarity and/or sufficiently low roughness.

First reflector element 12 is operated linearly by a drive unit not represented in further detail. Second reflector element 14 is formed in one piece with drive unit 28. Second reflector element 14 and drive unit 28 take the form of a MEMS micromirror 50. The MEMS micromirror 50, including second reflector element 14 and drive unit 28, forms a reflector unit. Drive unit 28 induces MEMS micromirror 52 to vibrate at the resonant frequency of MEMS micromirror 50.

A temperature compensation unit 30 is connected to drive unit 28. Temperature compensation unit 30 is connected to drive unit 28 by an electrical line 32. Via electrical line 32, temperature compensation unit 30 may acquire, from drive unit 28, an electrical signal regarding a vibrational frequency of at least second reflector element 14. In the present example, temperature compensation unit 30 acquires an electrical signal regarding a vibrational frequency of MEMS micromirror 50 from drive unit 28. Temperature compensation unit 30 is configured to ascertain a temperature of the reflector unit from the vibrational frequency of MEMS micromirror 50.

Temperature compensation unit 30 includes a processing unit 36, which is situated inside of temperature compensation unit 30 and marked in outline by a dashed line. Processing unit 36 is configured to calculate the temperature of the reflector unit from the vibrational frequency of at least second reflector element 14 and/or to calculate a change in the temperature of the reflector unit from a change in the vibrational frequency of at least second reflector element 14.

In addition, laser projection device 10 includes a frequency reference element 38. Frequency reference element 38 takes the form of a quartz oscillator. Frequency reference element 38 vibrates at a reference frequency. The reference frequency corresponds to the resonant frequency of MEMS micromirror 50 at a precisely defined temperature of the reflector unit. Frequency reference element 38 is configured to provide the reference frequency to temperature compensation unit 30. Frequency reference element 38 is connected to temperature compensation unit 30 via an electrical line 40 and provides the reference frequency to temperature compensation unit 30 in the form of an electrical signal.

Temperature compensation unit 30 is configured to correlate the electrical signal regarding the vibrational frequency of MEMS micromirror 50 of drive unit 28 with the electrical signal regarding the reference frequency of frequency reference element 38. Temperature compensation unit 30 may ascertain the vibrational frequency of MEMS micromirror 50 with the aid of a correlation of the two electrical signals.

In addition, with the aid of the ascertained temperature of the reflector unit, temperature compensation unit 30 is configured to compensate for a temperature-dependent deviation of a detected position of at least second reflector element 14. The reflector unit includes piezoelectric measuring bridge 34 for detecting a position of at least second reflector element 14. Piezoelectric measuring bridge 34 takes the form of a Wheatstone bridge having at least one piezoresistive element. Piezoelectric measuring bridge 34 is connected mechanically to second reflector element 14. Different positions of second reflector element 14 apply different forces to piezoelectric measuring bridge 34 via a mechanical coupling, which results in different electrical voltage signals of piezoelectric measuring bridge 34. Temperature compensation unit 30 may acquire the electrical voltage signals of piezoelectric measuring bridge 34 via an electrical line 42. The electrical voltage signals of piezoelectric measuring bridge 34 may also change due to a change in temperature of the reflector unit. A temperature drift of piezoelectric measuring bridge 34 occurs. Temperature compensation unit 30 is configured to compensate for the temperature drift of piezoelectric measuring bridge 34 in light of the ascertained temperature of the reflector unit. Processing unit 36 of temperature compensation unit 30 may calculate a correction coefficient in light of the ascertained change in temperature of the reflector unit. To compensate for the temperature drift of piezoelectric measuring bridge 34, processing unit 36 of temperature compensation unit 30 may include the correction coefficient in the electrical voltage signal of piezoelectric measuring bridge 34.

Figure 2:
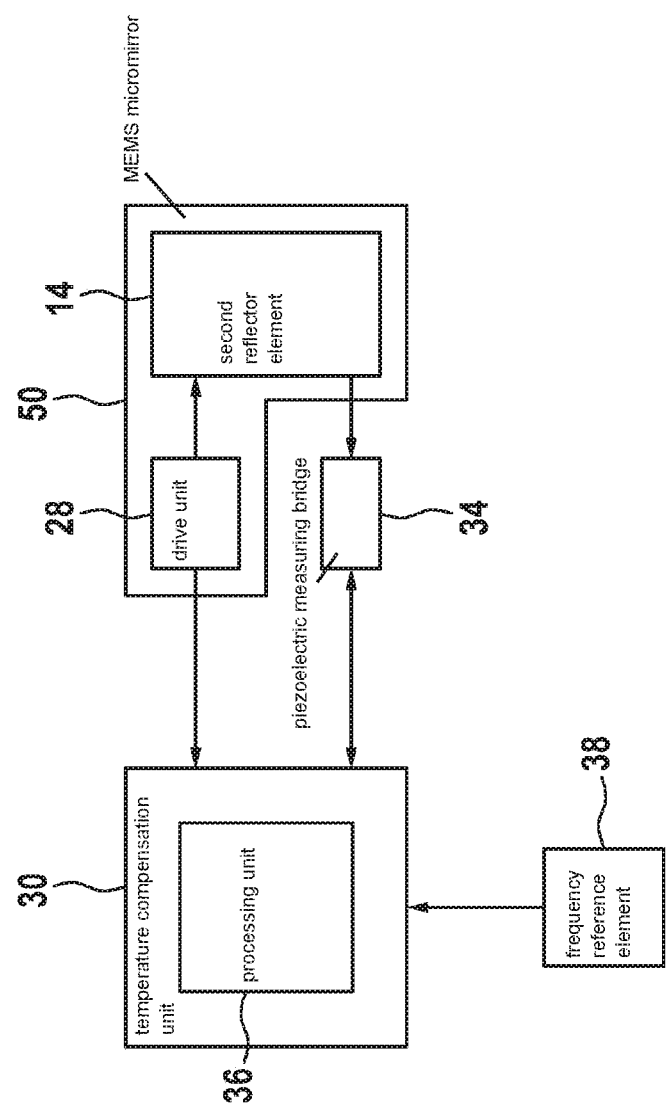
FIG. 2 shows a block diagram of an example method of the present invention for operating the laser projection device.

FIG. 2 shows a block diagram of an example method of the present invention for operating laser projection device 10. The reflector unit, temperature compensation unit 30, piezoelectric measuring bridge 34, and frequency reference element 38 of laser projection device 10 are represented in the block diagram. The reflector unit includes second reflector element 14 and drive unit 28. Together with a mechanical spring system not shown in further detail, second reflector element 14 and drive unit 28 form MEMS micromirror 50. Temperature compensation unit 30 includes processing unit 36.

In one method step, the temperature of the reflector unit is ascertained in light of the vibrational frequency of MEMS micromirror 50. The temperature of the reflector unit is ascertained with the aid of temperature compensation unit 30. A signal regarding the vibrational frequency of second reflector element 14 is acquired from temperature compensation unit 30 by drive unit 28. A characteristic curve regarding the dependency of the vibrational frequency of MEMS micromirror 50 on the temperature of the reflector unit is stored in a storage unit of processing unit 36 of temperature compensation unit 30. The temperature of the reflector unit is calculated by processing unit 36 in light of the acquired vibrational frequency of MEMS micromirror 50, and in light of the characteristic curve.

In a further method step, the temperature of the reflector unit is calculated from the vibrational frequency of MEMS micromirror 50, and/or a change in the temperature of the reflector unit is calculated from a change in the vibrational frequency of MEMS micromirror 50. The temperature of the reflector unit is calculated in a manner analogous to the method step described above. To calculate the change in temperature of the reflector unit, the temperature of the reflector unit is ascertained by temperature compensation unit 30 at two different times in light of the vibrational frequency of MEMS micromirror 50. If the vibrational frequency of MEMS micromirror 50 changes between the two times, then the temperature of the reflector unit also changes, and the change in the temperature of the reflector unit may be calculated with the aid of the processing unit 36 of temperature compensation unit 30.

In a further method step, a reference frequency is provided, and the vibrational frequency of MEMS micromirror 50 is ascertained in light of a correlation with the reference frequency. The reference frequency is provided to temperature compensation unit 30 by frequency reference element 38. The signal regarding the vibrational frequency of MEMS micromirror 50 from drive unit 28 is correlated with the reference frequency with the aid of processing unit 36 of temperature compensation unit 30. The vibrational frequency of MEMS micromirror 50 is ascertained in light of the correlation with the reference frequency.

In a further method step, a temperature-dependent deviation of a detected position of second reflector element 14 is compensated for in light of the ascertained temperature. The change in the temperature may cause a deviation in the detected position of second reflector element 14. A correction coefficient for the detected position of second reflector element 14 is calculated by processing unit 36 of temperature compensation unit 30 in light of the ascertained temperature. Using the correction coefficient, the temperature-dependent deviation of the detected position of second reflector element 14 is compensated for by temperature compensation unit 30.

In a further method step, the position of second reflector element 14 is detected with the aid of piezoelectric measuring bridge 34, and a temperature drift of piezoelectric measuring bridge 34 is compensated for in light of the ascertained temperature. With the aid of piezoelectric measuring bridge 34, different forces exerted on piezoelectric measuring bridge 34 by second reflector element 14 are measured and converted to different electrical voltage signals. The different electrical voltage signals correspond to different positions of second reflector element 14. Piezoelectric measuring bridge 34 exhibits a temperature drift in response to a change in the temperature. With the aid of the ascertained temperature, the temperature drift of piezoelectric measuring bridge 34 is compensated for by temperature compensation unit 30, by generating a correction coefficient for the electrical voltage signal.

Figure 3:
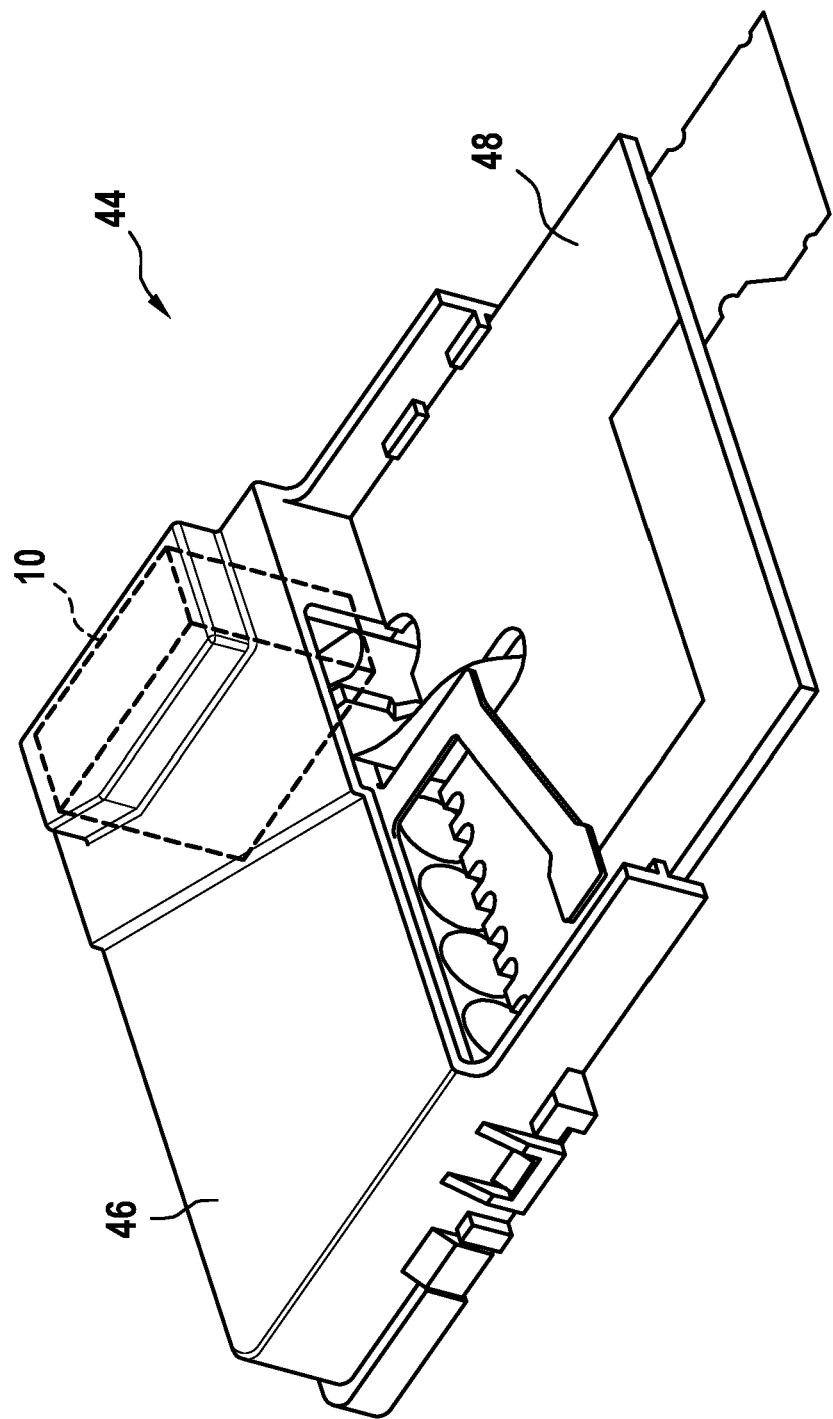
FIG. 3 shows a perspective view of an example laser projector according to the present invention.

FIG. 3 shows a perspective view of an example laser projector 44 according to the present invention. Laser projector 44 includes laser projection device 10. Laser projection device 10 is situated inside of a housing 46 of laser projector 44 and is indicated by a region marked in outline by a dashed line. Laser projection device 10 is situated on a main board 48 of laser projector 44.

What is claimed is:

1. A laser projection device, comprising:
   at least one reflector unit having at least a reflector element that is configured to deflect at least one laser beam to be projected;
   at least one drive unit that is configured to excite at least the reflector element into resonant vibration; and
   at least one temperature compensation unit which is configured to acquire a vibrational frequency of at least the reflector element and to ascertain a temperature of the reflector unit from the acquired vibrational frequency, wherein a characteristic curve of a dependence of the vibrational frequency on the temperature of the reflector unit is stored in a storage unit of the temperature compensation unit, wherein the temperature of the reflector unit is calculated based on a comparison of the acquired vibrational frequency with the characteristic curve.

2. The laser projection device as recited in claim 1, wherein the temperature compensation unit includes at least one processing unit which is configured to at least one of calculate the temperature of the reflector unit from the vibrational frequency of at least the reflector element, or calculate a change in the temperature of the reflector unit from a change in the vibrational frequency of at least the reflector element.

3. The laser projection device as recited in claim 1, further comprising:
at least one frequency reference element which is configured to provide at least one reference frequency for the temperature compensation unit, wherein the temperature compensation unit is configured to ascertain the vibrational frequency of at least the reflector element in light of a correlation with the reference frequency.

4. The laser projection device as recited in claim 1, wherein the temperature compensation unit is configured to compensate for a temperature-dependent deviation of a detected position of at least the reflector element in light of the ascertained temperature.

5. The laser projection device as recited in claim 1, further comprising:
at least one piezoelectric measuring bridge configured to detect a position of at least the reflector element;
wherein the temperature compensation unit is configured to compensate for a temperature drift of the piezoelectric measuring bridge in light of the ascertained temperature.

6. A method for operating a laser projection device, the laser projection device including at least one reflector unit including at least one reflector element that is configured to deflect at least one laser beam to be projected, and including at least one drive unit that is configured to excite at least the reflector element into resonant vibration, the method comprising:
ascertaining a temperature of the reflector unit in light of a vibrational frequency of at least the reflector element, wherein the temperature of the reflector unit is calculated based on a comparison of an acquired vibrational frequency with a characteristic curve of a dependence of the vibrational frequency on the temperature of the reflector unit.

7. The method as recited in claim 6, wherein the temperature of the reflector unit is calculated from at least one of the vibrational frequency of at least the reflector element, or a change in the temperature of the reflector unit is calculated from a change in the vibrational frequency of at least the reflector element.

8. The method as recited in claim 6, wherein a reference frequency is provided, and the vibrational frequency of at least the reflector element is ascertained in light of a correlation with the reference frequency.

9. The method as recited in claim 6, further comprising:
compensating for a temperature-dependent deviation of a detected position of at least the reflector element in light of the ascertained temperature.

10. The method as recited in claim 6, further comprising:
detecting a position of at least the reflector element using a piezoelectric measuring bridge; and
compensating for a temperature drift of the piezoelectric measuring bridge in light of the ascertained temperature.

11. A laser projector, comprising:
at least one laser projection device including at least one reflector unit having at least one reflector element that is configured to deflect at least one laser beam to be projected, at least one drive unit that is configured to excite at least the reflector element into resonant vibration, and at least one temperature compensation unit which is configured to acquire a vibrational frequency of at least the reflector element and to ascertain a temperature of the reflector unit from the acquired vibrational frequency,
wherein a characteristic curve of a dependence of the vibrational frequency on the temperature of the reflector unit is stored in a storage unit of the temperature compensation unit,
wherein the temperature of the reflector unit is calculated based on a comparison of the acquired vibrational frequency with the characteristic curve.

* * * * *